United States Patent
Morgan et al.

(10) Patent No.: US 8,659,404 B2
(45) Date of Patent: Feb. 25, 2014

(54) METHODS AND SYSTEMS RELATED TO ESTABLISHING GEO-FENCE BOUNDARIES AND COLLECTING DATA

(75) Inventors: Gerald A. Morgan, Littleton, CO (US); Stanley G. Schwarz, Indialantic, FL (US); Jeffrey H. Frank, Littleton, CO (US); Christopher M. Macheca, Centennial, CO (US)

(73) Assignee: Gordon Howard Associates, Inc., Littleton, CO (US)

( * ) Notice: Subject to any disclaimer, the term of this patent is extended or adjusted under 35 U.S.C. 154(b) by 0 days.

(21) Appl. No.: 13/545,745

(22) Filed: Jul. 10, 2012

(65) Prior Publication Data
US 2012/0303256 A1    Nov. 29, 2012

Related U.S. Application Data (63) Continuation-in-part of application No. 13/364,662, filed on Feb. 2, 2012, now Pat. No. 8,217,772, which is a continuation of application No. 13/215,732, filed on Aug. 23, 2011, now Pat. No. 8,164,431, which is a continuation of application No. 12/333,904, filed on Dec. 12, 2008, now Pat. No. 8,018,329.

(51) Int. Cl.
    *B60R 25/10*    (2013.01)
(52) U.S. Cl.
    USPC ............. 340/426.19; 340/426.18; 340/539.13
(58) Field of Classification Search
    USPC ........... 340/426.19, 989, 436, 426.18, 425.5, 340/426.22, 426.2, 426.1, 426.36, 539.13
    See application file for complete search history.

(56) References Cited

U.S. PATENT DOCUMENTS

| | | | |
|---|---|---|---|
| 4,335,370 A | 6/1982 | Scalley et al. | |
| 4,592,443 A | 6/1986 | Simon | |
| 4,624,578 A | 11/1986 | Green | |
| 4,688,026 A | 8/1987 | Scribner et al. | |
| 4,700,296 A | 10/1987 | Palmer, Jr. et al. | |
| 4,738,333 A | 4/1988 | Collier et al. | |
| 4,800,590 A | 1/1989 | Vaughan | |
| 5,014,206 A | 5/1991 | Scribner et al. | |
| 5,132,968 A | 7/1992 | Cephus | |
| 5,228,083 A | 7/1993 | Lozowick et al. | |
| 5,426,415 A | 6/1995 | Prachar et al. | |
| 5,490,200 A | 2/1996 | Snyder et al. | |

(Continued)

FOREIGN PATENT DOCUMENTS

| | | |
|---|---|---|
| EP | 1557807 | 7/2005 |
| WO | 9616845 | 6/1996 |

(Continued)

OTHER PUBLICATIONS

US 5,699,633, 12/1997, Roser (withdrawn).

(Continued)

*Primary Examiner* — Toan N Pham
(74) *Attorney, Agent, or Firm* — Mark E. Scott; Conley Rose, P.C.

(57) ABSTRACT

Establishing geo-fence boundaries and collecting data. At least some of the illustrative embodiments are methods including: detecting a vehicle is located within a first political boundary; establishing a first geo-fence boundary for the vehicle corresponding to the first political boundary, the establishing responsive to detecting the vehicle is within the first political boundary; collecting data regarding the vehicle movement within the first geo-fence boundary; and detecting the vehicle has departed the first geo-fence boundary.

25 Claims, 4 Drawing Sheets

(56) References Cited

U.S. PATENT DOCUMENTS

| | | |
|---|---|---|
| 5,495,531 A | 2/1996 | Smiedt |
| 5,510,780 A | 4/1996 | Norris et al. |
| 5,619,573 A | 4/1997 | Brinkmeyer et al. |
| 5,673,318 A | 9/1997 | Bellare et al. |
| 5,708,712 A | 1/1998 | Brinkmeyer et al. |
| 5,775,290 A | 7/1998 | Staerzi et al. |
| 5,797,134 A | 8/1998 | McMillan et al. |
| 5,818,725 A | 10/1998 | McNamara et al. |
| 5,819,869 A | 10/1998 | Horton |
| 5,898,391 A | 4/1999 | Jefferies et al. |
| 5,917,405 A | 6/1999 | Joao |
| 5,970,143 A | 10/1999 | Schneier et al. |
| 6,025,774 A | 2/2000 | Forbes |
| 6,026,922 A | 2/2000 | Horton |
| 6,032,258 A | 2/2000 | Godoroja et al. |
| 6,064,970 A | 5/2000 | McMillan et al. |
| 6,088,143 A | 7/2000 | Bang |
| 6,130,621 A | 10/2000 | Weiss |
| 6,157,317 A | 12/2000 | Walker |
| 6,185,307 B1 | 2/2001 | Johnson, Jr. |
| 6,195,648 B1 | 2/2001 | Simon et al. |
| 6,249,217 B1 | 6/2001 | Forbes |
| 6,278,936 B1 | 8/2001 | Jones |
| 6,353,776 B1 | 3/2002 | Rohrl et al. |
| 6,370,649 B1 | 4/2002 | Angelo et al. |
| 6,380,848 B1 | 4/2002 | Weigl et al. |
| 6,401,204 B1 | 6/2002 | Euchner et al. |
| 6,429,773 B1 | 8/2002 | Schuyler |
| 6,489,897 B2 | 12/2002 | Simon |
| 6,587,739 B1 | 7/2003 | Abrams et al. |
| 6,601,175 B1 | 7/2003 | Arnold et al. |
| 6,611,201 B1 | 8/2003 | Bishop et al. |
| 6,611,686 B1 | 8/2003 | Smith et al. |
| 6,615,186 B1 | 9/2003 | Kolls |
| 6,665,613 B2 | 12/2003 | Duvall |
| 6,714,859 B2 | 3/2004 | Jones |
| 6,717,527 B2 | 4/2004 | Simon |
| 6,741,927 B2 | 5/2004 | Jones |
| 6,804,606 B2 | 10/2004 | Jones |
| 6,812,829 B1 | 11/2004 | Flick |
| 6,816,089 B2 | 11/2004 | Flick |
| 6,816,090 B2 | 11/2004 | Teckchandani et al. |
| 6,828,692 B2 | 12/2004 | Simon |
| 6,868,386 B1 | 3/2005 | Henderson et al. |
| 6,870,467 B2 | 3/2005 | Simon |
| 6,873,824 B2 | 3/2005 | Flick |
| 6,888,495 B2 | 5/2005 | Flick |
| 6,917,853 B2 | 7/2005 | Chirnomas |
| 6,924,750 B2 | 8/2005 | Flick |
| 6,950,807 B2 | 9/2005 | Brock |
| 6,952,645 B1 | 10/2005 | Jones |
| 6,961,001 B1 | 11/2005 | Chang et al. |
| 6,972,667 B2 | 12/2005 | Flick |
| 6,985,583 B1 | 1/2006 | Brainard et al. |
| 6,993,658 B1 | 1/2006 | Engberg et al. |
| 7,005,960 B2 | 2/2006 | Flick |
| 7,015,830 B2 | 3/2006 | Flick |
| 7,020,798 B2 | 3/2006 | Meng et al. |
| 7,031,826 B2 | 4/2006 | Flick |
| 7,031,835 B2 | 4/2006 | Flick |
| 7,039,811 B2 | 5/2006 | Ito |
| 7,053,823 B2 | 5/2006 | Cervinka et al. |
| 7,061,137 B2 | 6/2006 | Flick |
| 7,091,822 B2 | 8/2006 | Flick et al. |
| 7,103,368 B2 | 9/2006 | Teshima |
| 7,123,128 B2 | 10/2006 | Mullet et al. |
| 7,124,088 B2 | 10/2006 | Bauer et al. |
| 7,133,685 B2 | 11/2006 | Hose et al. |
| 7,149,623 B2 | 12/2006 | Flick |
| 7,205,679 B2 | 4/2007 | Flick |
| 7,224,083 B2 | 5/2007 | Flick |
| 7,266,507 B2 | 9/2007 | Simon et al. |
| 7,299,890 B2 | 11/2007 | Mobley |
| 7,323,982 B2 | 1/2008 | Staton et al. |
| 7,327,250 B2 | 2/2008 | Harvey |
| 7,379,805 B2 | 5/2008 | Olsen, III et al. |
| 7,389,916 B2 | 6/2008 | Chirnomas |
| 7,561,102 B2 | 7/2009 | Duvall |
| 7,823,681 B2 | 11/2010 | Crespo et al. |
| 7,873,455 B2 | 1/2011 | Arshad et al. |
| 7,877,269 B2 | 1/2011 | Bauer et al. |
| 7,930,211 B2 | 4/2011 | Crolley |
| 8,018,329 B2 | 9/2011 | Morgan et al. |
| 8,095,394 B2 | 1/2012 | Nowak et al. |
| 8,140,358 B1 | 3/2012 | Ling et al. |
| 8,217,772 B2 | 7/2012 | Morgan et al. |
| 8,370,027 B2 | 2/2013 | Pettersson et al. |
| 2001/0040503 A1 | 11/2001 | Bishop |
| 2002/0019055 A1 | 2/2002 | Brown |
| 2002/0193926 A1 | 12/2002 | Katagishi et al. |
| 2003/0036823 A1 | 2/2003 | Mahvi |
| 2003/0151501 A1 | 8/2003 | Teckchandani et al. |
| 2003/0191583 A1 | 10/2003 | Uhlmann et al. |
| 2004/0088345 A1 | 5/2004 | Zellner et al. |
| 2004/0153362 A1 | 8/2004 | Bauer et al. |
| 2004/0176978 A1 | 9/2004 | Simon et al. |
| 2004/0177034 A1 | 9/2004 | Simon et al. |
| 2004/0203974 A1 | 10/2004 | Seibel et al. |
| 2004/0204795 A1 | 10/2004 | Harvey et al. |
| 2004/0239510 A1 | 12/2004 | Karsten |
| 2005/0017855 A1 | 1/2005 | Harvey |
| 2005/0033483 A1 | 2/2005 | Simon et al. |
| 2005/0134438 A1 | 6/2005 | Simon |
| 2005/0162016 A1 | 7/2005 | Simon |
| 2005/0270178 A1 | 12/2005 | Ioli |
| 2006/0059109 A1 | 3/2006 | Grimes |
| 2006/0108417 A1 | 5/2006 | Simon |
| 2006/0111822 A1 | 5/2006 | Simon |
| 2006/0122748 A1 | 6/2006 | Nou |
| 2006/0136314 A1 | 6/2006 | Simon |
| 2007/0010922 A1 | 1/2007 | Buckley |
| 2007/0176771 A1 | 8/2007 | Doyle |
| 2007/0185728 A1 | 8/2007 | Schwarz et al. |
| 2007/0194881 A1 | 8/2007 | Schwarz et al. |
| 2008/0114541 A1 | 5/2008 | Shintani et al. |
| 2008/0162034 A1 | 7/2008 | Breen |
| 2008/0221743 A1 | 9/2008 | Schwarz et al. |
| 2009/0043409 A1 | 2/2009 | Ota |
| 2009/0182216 A1 | 7/2009 | Roushey, III et al. |
| 2010/0148947 A1 | 6/2010 | Morgan et al. |
| 2010/0268402 A1 | 10/2010 | Schwarz et al. |
| 2011/0050407 A1 | 3/2011 | Schoenfeld et al. |
| 2011/0057800 A1 | 3/2011 | Sofer |
| 2011/0063138 A1 | 3/2011 | Berkobin et al. |
| 2011/0084820 A1 | 4/2011 | Walter et al. |
| 2011/0153143 A1 | 6/2011 | O'Neil et al. |
| 2012/0133530 A1 | 5/2012 | Morgan et al. |

FOREIGN PATENT DOCUMENTS

| | | |
|---|---|---|
| WO | 2007092272 | 8/2007 |
| WO | 2007092287 | 8/2007 |
| WO | 2010/068438 A2 | 6/2010 |

OTHER PUBLICATIONS

Schwarz et al. Office Action dated Aug. 21, 2009; U.S. Appl. No. 11/349,523, filed Feb. 7, 2006, p. 18.

Schwarz et al., Response to Office Action dated Aug. 21, 2009; filed Jan. 21, 2010; U.S. Appl. No. 11/349,523, filed Feb. 7, 2006, 36 p.

Schwarz et al., Final Office Action dated May 4, 2010; U.S. Appl. No. 11/349,523, filed Feb. 7, 2006, 19 p.

Schwarz et al., RCE and Response to Final Office Action dated May 4, 2010, filed Jul. 12, 2010; U.S. Appl. No. 11/349,523, filed Feb. 7, 2006, 40 p.

Schwarz et al., Office Action dated Oct. 26, 2010; U.S. Appl. No. 11/349,523, filed Feb. 7, 2006, 16 p.

Schwarz et al., Response to Office Action dated Oct. 26, 2010, filed Feb. 21, 2011; U.S. Appl. No. 11/349,523, filed Feb. 7, 2006, 27 p.

Schwarz et al., Final Office Action dated Apr. 28, 2011; U.S. Appl. No. 11/349,523, filed Feb. 7, 2006, 17 p.

Schwarz et al., Preliminary Amendment filed Mar. 16, 2007; U.S. Appl. No. 11/539,292, filed Oct. 6, 2006, 28 p.

(56) References Cited

OTHER PUBLICATIONS

Schwarz et al., Office Action dated Jul. 22, 2009; U.S. Appl. No. 11/539,292, filed Oct. 6, 2006, 22 p.
Schwarz et al., Office Action dated May 14, 2010; U.S. Appl. No. 11/539,292, filed Oct. 6, 2006, 13 p.
Schwarz et al., Response to Office Action dated May 14, 2010, filed Jul. 12, 2010; U.S. Appl. No. 11/539,292, filed Oct. 6, 2006, 50 p.
Schwarz et al., Office Action dated Oct. 15, 2010; U.S. Appl. No. 11/539,292, filed Oct. 6, 2006, 13 p.
Schwarz et al., Response to Office Action dated Oct. 15, 2010 filed Feb. 15, 2011; U.S. Appl. No. 11/539,292, filed Oct. 6, 2006, 36 p.
Schwarz et al., Final Office Action dated May 26, 2011; U.S. Appl. No. 11/539,292, filed Oct. 6, 2006, 16 p.
Gordon*Howard Associates, Inc., International Search Report and Written Opinion of the International Searching Authority dated Nov. 29, 2007 in PCT Patent Application No. PCT/US07/02816, 6 p.
Gordon*Howard Associates, Inc., International Search Report and Written Opinion of the International Searching Authority dated Dec. 4, 2007 in PCT Patent Application No. PCT/US07/02840, 6 p.
On Time Payment Protection Systems, printed Jan. 2, 2004 from www.ontime-pps.com/how.html.
Aircept Products, printed Jan. 2, 2004 from www.aircept.com/products.html.
How PayTeck Works, printed Jan. 2, 2004 from www.payteck.cc/aboutpayteck.html.
Article: "Pager Lets You Locate Your Car, Unlock and Start It", published Dec. 10, 1997 in USA Today.
Article: "Electronic Keys Keep Tabs on Late Payers", published Sep. 22, 1997 in Nonprime Auto News.
Article: "PASSTEC Device Safely Prevents Vehicles from Starting", published Jul. 19, 1999 in Used Car News.
Payment Clock Disabler advertisement, published, May 18, 1998.
Secure Your Credit & Secure Your Investment (Pay Teck advertisement), printed Jan. 2, 2004 from www.payteck.cc.
iMetrik Company Information, printed Dec. 21, 2006 from imetrik.com.
About C-CHIP Technologies, printed Dec. 21, 2006 from www.c-chip.com.
Hi-Tech tools to solve traditional problems, printed Dec. 21, 2006 from www.c-chip.com.
C-CHIP Technologies Products: Credit Chip 100, Credit Chip 100C, Credit Chip 200, printed Dec. 21, 2006 from www.c-chip.com.
The Credit Chip 100, printed Dec. 21, 2006 from www.c-chip.com.
PCT Search Report, International Application No. PCT/US2013/049090, mailed Sep. 27, 2013.

METHODS AND SYSTEMS RELATED TO ESTABLISHING GEO-FENCE BOUNDARIES AND COLLECTING DATA

CROSS-REFERENCE TO RELATED APPLICATIONS

This application is a continuation-in-part of U.S. patent application Ser. No. 13/364,662 for "AUTOMATED GEO-FENCE BOUNDARY CONFIGURATION AND ACTIVATION," filed Feb. 2, 2012, which was a continuation of U.S. patent application Ser. No. 13/215,732 filed Aug. 23, 2011 (now U.S. Pat. No. 8,164,431), which was a continuation of U.S. patent application Ser. No. 12/333,904 filed Dec. 12, 2008 (now U.S. Pat. No. 8,018,329). All related applications are incorporated herein by reference as if reproduced in full below.

BACKGROUND

Governments, including state and federal governments, have traditionally funded public infrastructure projects from tax revenue derived from fuel taxes. States may tax fuel purchased not only by in-state drivers, but also by drivers that travel through the state. With the development and availability of hybrid and electric cars on the market, governments will need to consider new ways of deriving tax revenue to fund public infrastructure. Therefore, any invention which provides information related to calculating and collecting transportation taxes would be useful.

BRIEF DESCRIPTION OF THE DRAWINGS

For a detailed description of exemplary embodiments, reference will now be made to the accompanying drawings in which.

Notation and Nomenclature

Certain terms are used throughout the following description and claims to refer to particular system components. As one skilled in the art will appreciate, different companies may refer to a component and/or method by different names. This document does not intended to distinguish between components and/or methods that differ in name but not in function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

"Remote" shall mean one kilometer or more.

"Political Boundary" shall mean the geographic boundary of a political entity or legal jurisdiction.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various embodiments are directed to configuring and creating a geo-fence boundary corresponding to the size and shape of a political boundary once a vehicle is detected as having crossed into the area defined by the political boundary, as well as collecting data related to the movement of the vehicle within the geo-fence boundary. The specification first turns to an illustrative system.

Figure 1:
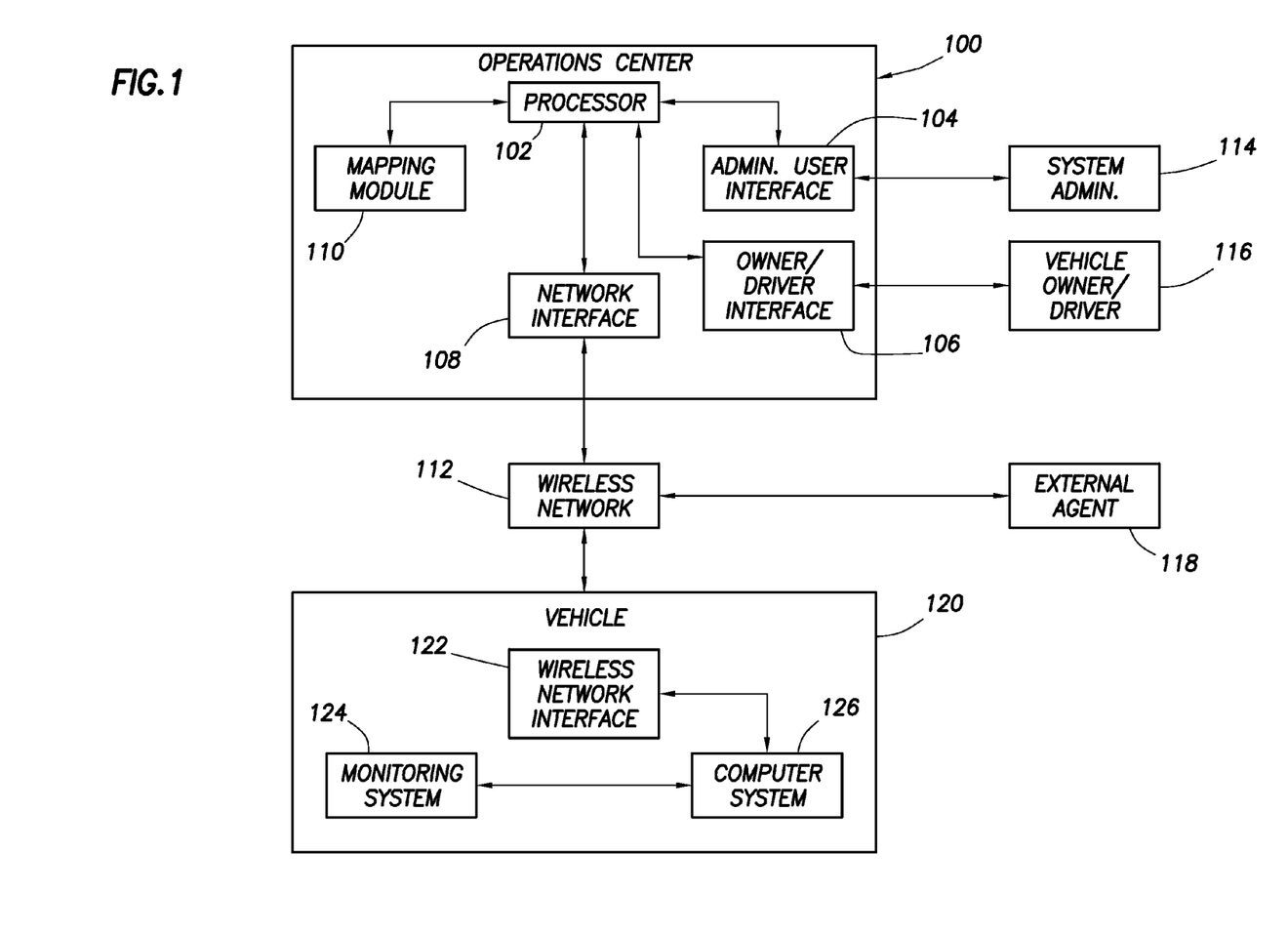
FIG. 1 shows, in block diagram form, an overall architecture of a system in accordance with at least some embodiments.

FIG. 1 shows, in block diagram form, a system in accordance with at least some embodiments. In particular, the system comprises an operations center 100 communicatively coupled to a vehicle 120 by way of a wireless network 112. The operations center 100 comprises a processor 102. In some embodiments, the processor 102 may be a stand-alone computer system, or the processor may comprise a plurality of computer systems communicatively coupled and performing the functions of the operations center, the functions discussed more thoroughly below. The processor 102 may couple to an administrative user interface 104. The administrative user interface 104 may enable a system administrator 114 to control or configure the operation of the system. In some embodiments, the processor 102 may also couple to an owner user interface 106, which likewise enables an owner of the vehicle to interact with the system.

The operations center 100 may further comprise a mapping module 110 coupled to the processor 102. In accordance with at least some embodiments, the mapping module 110 is a stand-alone computer system executing software to perform a mapping function associated with the location of the vehicle 120 and any geo-fence boundaries that may be established. In yet still other embodiments, the mapping module 110 may be a computer program or program package that operates or executes on the processor 102.

In order to communicate with the vehicle 120, the operations center may further comprise a network interface 108 communicatively coupled to the processor 102. By way of the network interface, the processor 102, and any programs executing thereon, may communicate with vehicle 120, such as by wireless network 112. Wireless network 112 is illustrative of any suitable communications network, such as a cellular network, a pager network, or other mechanism for transmitting information between the operations center 100 and the vehicle 120.

In accordance with at least some embodiments, the operations center 100 is remotely located from the vehicle 120. In some cases, the operations center 100 and vehicle 120 may be located within the same city or state. In other cases, the operations center 100 may be many hundreds or thousands of miles from vehicle 120, and thus the illustrative wireless network 112 may span several different types of communication networks.

Still referring to FIG. 1, the system further comprises a vehicle 120 communicatively coupled to operations center 100 by way of the illustrative wireless network 112. The vehicle 120 may comprise a computer system 126 communicatively coupled to a wireless network interface 122 and a monitoring system 124. The wireless network interface 122 enables the computer system 126 to communicate with operations center 100 by way of a wireless transmission through the wireless network 112. The monitoring system 124 may assist the computer system 126 and/or the operations center 100 in determining when the vehicle 120 has crossed into, or departed, a geo-fence boundary, and may also assist the computer system 126 and/or the operations center 100 in collecting data regarding movement of the vehicle 120 within an established geo-fence boundary. Various techniques for detecting a vehicle is located within a political boundary, as well as determining whether vehicle 120 has departed a geo-fence boundary, will be discussed more thoroughly below.

Figure 2:
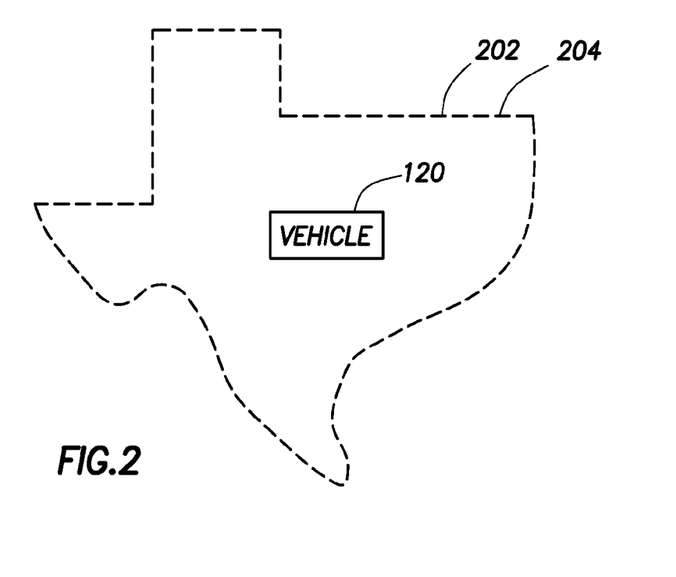
FIG. 2 shows an example embodiment of establishing a geo-fence.

The specification now turns to a high level description of detecting a vehicle is located within a political boundary and automatically establishing a geo-fence boundary corresponding to the political boundary. In particular, FIG. 2 shows vehicle 120 located within political boundary 202. In this example, the political boundary 202 is the border of the state of Texas, but the political boundary may be any political boundary, such as another state, a city, a county, or a country. Detecting that vehicle 120 is located within political boundary 202 may take many forms, but for purposes of this portion of the disclosure, assume that the detection is by way of, at least in part, a device or devices in the monitoring system 124 coupled to the computer 126.

Referring still to FIG. 2, responsive to detection that vehicle 120 has crossed a political boundary 202, a geo-fence boundary 204 is automatically established having the shape and size corresponding to the political boundary 202. More particularly, a geo-fence boundary 204 is automatically established which corresponds to the borders of the political boundary 202. The establishing is without, at the time the vehicle 120 crosses into the state, any input from an administrator, vehicle owner, or external agent. Note that in this example, the geo-fence boundary 204 is aligned with the border of the state of Texas; however, the geo-fence boundary may be aligned with another political boundary such as county boundaries, city boundaries, or national boundaries. While the vehicle 120 resides within the political boundary 202, the system may collect data regarding vehicle movement (discussed more below), and may also detect when the vehicle has departed the political boundary 202, as discussed with respect to FIG. 3.

Figure 3:
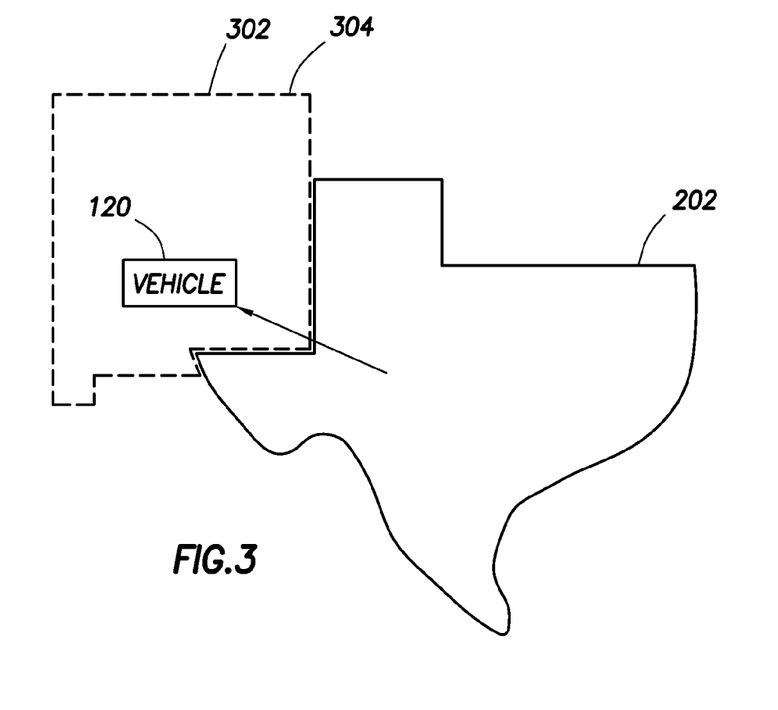
FIG. 3 shows an example embodiment of establishing a second geo-fence.

FIG. 3 shows a graphical representation of vehicle 120 crossing from first political boundary to a second political boundary. In particular, in the example of FIG. 3 the vehicle 120 crossed from the political boundary 202 being the state of Texas into the political boundary 302 being the state of New Mexico. In the example of FIG. 3, the system determines that the vehicle 120 has crossed from the political boundary 202 into political boundary 302. Detecting vehicle 120 is now located within the political boundary 302, in this example, a geo-fence boundary 304 is automatically established having the shape and size corresponding to the political boundary 302. Additionally, at this point, the geo-fence boundary 202 corresponding to the size and shape of the political boundary of the state of Texas is de-established. The establishing of the geo-fence boundary 302 is without, at the time the vehicle 120 crosses into the state, any input from an administrator, vehicle owner, or external agent. Note that in this example the geo-fence boundary is aligned with the borders of the state of New Mexico; again, however, the geo-fence boundary may be aligned with another political boundary such as county boundaries, city boundaries, or national boundaries. While the vehicle 120 resides within the political boundary 302, the system may again collect data regarding vehicle movement (discussed more below), and may also detect when the vehicle has departed the political boundary 302. The specification now turns to example embodiments of establishing a geo-fence boundary.

Establishing the Geo-Fence

Operations Center Establishment of the Geo-Fence

In some cases, mapping module 110 of the remote operations center 100 may play a role in establishing the geo-fence when vehicle 120 crosses into a political boundary. In particular, the mapping module may periodically receive information from the vehicle regarding vehicle location. In the example of FIG. 3, at or near the time vehicle 120 crosses a political boundary the location of the vehicle 120 may be provided to the mapping module 110. The mapping module 110 may then determine that the vehicle 120 has crossed the political boundary 202 corresponding to the boundary of the state of Texas and into the political boundary 302 corresponding to the state of New Mexico. Mapping module 110 (in combination with programs executing on processor 102) detecting vehicle 120 is located within the political boundary 302 of New Mexico in this example, creates a geo-fence boundary 304 corresponding to the size and shape of state of New Mexico. Thus, in these embodiments, the operations center 100 establishes the corresponding geo-fence boundary. Additionally, at this point, the geo-fence boundary 202 corresponding to the size and shape of the political boundary of the state of Texas is de-established.

Vehicle Establishment of the Geo-Fence

Figure 4:
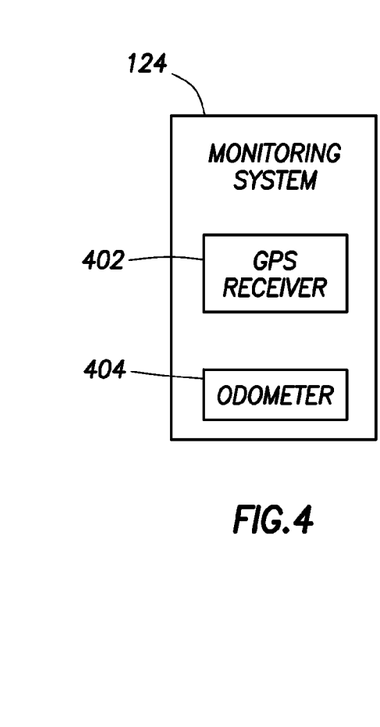
FIG. 4 shows, in block diagram form, a monitoring module in accordance with at least some embodiments.

In yet still other cases, systems within the vehicle 120 establish the geo-fence. In order to discuss embodiments of the vehicle establishing the geo-fence boundaries, the discussion turns briefly to a more detailed description of the monitoring system 124. In particular, FIG. 4 shows, in block diagram form, monitoring system 124 in greater detail. In accordance with at least some embodiments, the monitoring system 124 comprises a GPS receiver 402, as well as an odometer 404 (discussed more below in relation to determining mileage driven within the political boundary). The GPS system comprises a plurality of satellites broadcasting very precise timing signals. GPS receiver 402, receiving a plurality of the timing signals, may determine not only the location of the GPS receiver 402 (and thus, the vehicle 120) but may also establish navigation information, such as speed, direction of travel, and miles traveled. Thus, GPS receiver 402 receives the timing signals, determines location of the vehicle 120, and passes the location information to computer system 126. Computer system 126 processes the information received from the GPS receiver 402, and establishes an appropriate geo-fence boundary related to the political boundary over which the vehicle 122 has crossed (e.g., crossing from the state of Texas to the state of New Mexico discussed with respect to FIG. 3).

Regardless of how the geo-fence boundary is established, once the geo-fence boundary is established, in accordance with various embodiments data regarding movement of the vehicle 120 within the political boundary is collected. Thus, the specification now turns to example systems of collecting data regarding movement of the vehicle.

Collecting Data Regarding Movement

Tracking Mileage by Way of GPS and Vehicle

The GPS receiver 402, in addition to assisting with determining the location of the vehicle with respect to various political boundaries, in some cases also plays a role in collecting data regarding movement of the vehicle. For example, in some embodiments the GPS receiver 402 alone may track mileage driven by the vehicle 120 while the vehicle resides within the political jurisdiction. In yet still other cases, the GPS receiver 402 may work with the computer system 126 to track mileage driven. For example, the computer system 126 may receive periodic or continuous location information from the GPS receiver, and may use the information to calculate updated locations of the vehicle, and thus determine the amount of miles traveled between updates.

Tracking Mileage by Way of GPS and Operations Center

In yet still other embodiments, operations center 100 may be responsible for tracking mileage driven within a political boundary. For example, GPS receiver 402 and computer system 126 may periodically send indications of vehicle location to the operations center by way of the wireless network 112. In some embodiments, the periodic sending could be time-based (e.g., the GPS receiver 402 and computer system 126 send an indication of location every minute when the vehicle is in motion, or every ten minutes). In yet still other cases, the periodic sending could be location-based (e.g., the GPS receiver 402 and computer system 126 send an indication of location every mile, ten, miles, or 100 miles when the vehicle is in motion). Thus, the processor 102 of the operations center 100 may track the mileage driven by the vehicle based on data collected by devices associated with the vehicle; the data directly or indirectly indicates mileage driven. In yet still another embodiment, the GPS receiver 402 and computer system 126 may send an indication of location of the vehicle 120 only during the times the vehicle's ignition system is engaged (e.g., the motor is running). Thus, in this embodiment, miles are being tracked by the GPS receiver if the vehicle is being driven, and not if the vehicle is otherwise moving due to means other than driving (e.g., being towed or other transportation method). Moreover, in some cases the operations center 100 may track the mileage in spite of the fact the devices associated with the vehicle have the capability (e.g., to avoid tampering). Determining the amount of mileage traveled is not limited the GPS system, and other methods of determining mileage traveled are possible.

Determining Mileage from Odometer/Vehicle

Still referring to FIG. 4, in addition to, or in place of, the GPS receiver 402, in accordance with at least some embodiments the monitoring system 124 may comprise an odometer 404 coupled to the computer system 128. Odometer 404 may be a mechanical or digital odometer associated with the vehicle, or in some cases GPS receiver 402 may itself be programmed to act as an odometer. Thus, in accordance with at least some embodiments, collecting data regarding vehicle movement may involve the computer system 126 periodically or continuously reading or receiving updates from the odometer 404, and making a determination of mileage driven from the odometer 404. In one embodiment, an odometer 404 indication may be read at the time the ignition of the vehicle is turned on, and read again at the time the ignition is turned off. Mileage may then be calculated from the difference in values.

Determining Mileage from Odometer/Operations Center

In yet still other embodiments, collecting data regarding vehicle movement may be performed by the operations center 100 receiving information from odometer 404. In particular, in some cases the operations center may receive periodic or continuous updates regarding the odometer 404 indication, the updates sent from the vehicle 120 by way of wireless network 112. In these example embodiments, the processor 102 of the operations center 100 may calculate the miles driven by vehicle 122 based on the updates received from odometer 404.

Storing and Accessing Data

Regardless of the method by which mileage driven by vehicle 120 is determined, collected, and transmitted, the data collected corresponding to the mileage driven is eventually provided to external agent 118, such as a representative of the political boundary in which the vehicle is located or has just departed. The representative of the political boundary in FIG. 1 may be external agent 118, but external agent 118 is not limited to a political boundary representative and may be another interested party, such as the driver or owner of the vehicle or a system administrator. The discussion of providing data to external agent 118 starts with cases where the indication of mileage driven is determined by devices of the vehicle 120 without assistance of the operations center. In particular, in one embodiment data collected corresponding to the mileage driven may be stored in memory within computer system 126. Extracting the data stored in memory within computer system 126 may be accomplished by communicatively coupling a computer system directly to the computer system 126 (e.g., a universal serial bus (USB) connection, FireWire connection, RS-232 connection, RS-485 connection, IEEE 802.11 compliant wireless connection, BLUETOOTH wireless connection).

Still considering cases where the indication of mileage driven is determined by devices of the vehicle 120 without assistance of the operations center, in another embodiment mileage data collected may be stored on a removable storage device coupled to computer 126 such as: a USB flash drive; CompactFlash card; or Secure Digital card. At some point after data has been collected on the removable storage device, an external agent may remove the removable storage device in order to manually extract the data stored in memory.

In yet another embodiment, vehicle 120 may have the ability to directly transmit data, either continuously or periodically, such as by wireless network interface 122 through wireless network 112. However, in other cases, data collected by vehicle 120 may be transmitted by way of a wireless transmission through the wireless network 112 to the operations center 100 before being sent an external agent 118.

Now consider the situation where the operations center 100 is responsible for mileage data collection. In particular, in one embodiment data collected corresponding to the mileage driven may be stored in memory coupled to processor 102. Extracting the data stored in memory coupled to processor 102 may be accomplished by communicatively coupling a computer system directly to the processor 102 (e.g., a universal serial bus (USB) connection, FireWire connection, RS-232 connection, RS-485 connection, IEEE 802.11 compliant wireless connection, BLUETOOTH wireless connection).

Still considering cases where the indication of mileage driven is determined by the operations center 100, in another embodiment mileage data collected may be stored on a removable storage device coupled to processor 100, such as: a USB flash drive; CompactFlash card; or Secure Digital card. At some point after data has been collected on the removable storage device, an external agent may remove the removable storage device in order to manually extract the data stored in memory.

In yet another embodiment, the data center 100 may directly transmit data, either continuously or periodically to the external agent. Directly transmitting the data may be through the wireless network 112, but in other cases may involve transmission without using the wireless network 112, such as by way of the Internet.

In cases where the data is stored and then later sent to the external agent, and regardless of whether the storage is in the operations center 100 or the vehicle 120, the data may be sent periodically, such as at five miles intervals, 50 mile intervals, or 100 mile intervals. In yet another embodiment, odometer readings may be stored or sent at the time the vehicle enters a political boundary, and again when the vehicle departs a political boundary.

Figure 5:
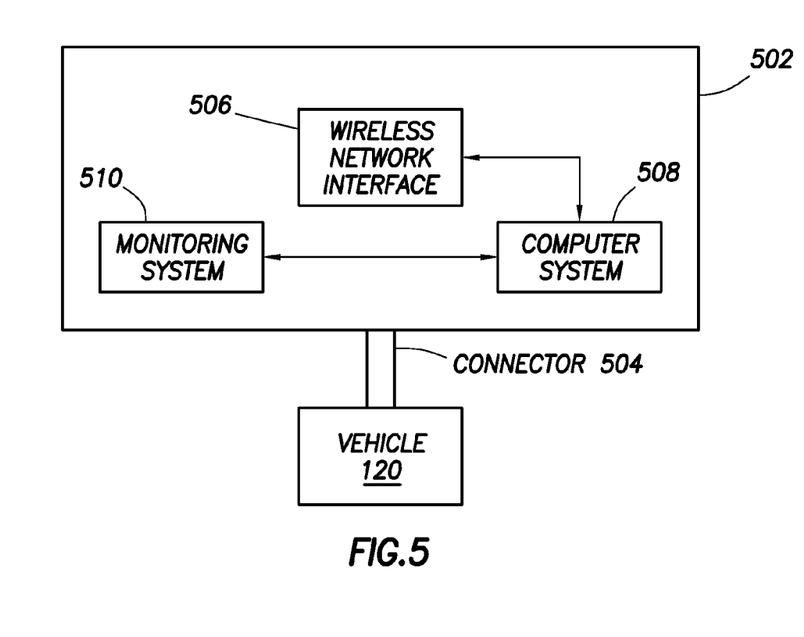
FIG. 5 shows, in block diagram form, an after-market system connected to a vehicle in accordance with at least some embodiments.

Referring now to FIG. 5, in some embodiments, the wireless network interface 122, computer system 126, and monitoring system 124 may be part of the vehicle 120 as a purchased from the manufacturer or dealer. In other embodiments, however, the wireless network interface, computer system, and monitoring system may be part of a third-party after-market system 502. In particular, FIG. 5 shows, in block diagram form, after-market system 502 coupled to vehicle 120 by way of an electrical connector 504. In some embodiments, the after-market system 502 may be mechanically coupled to the inside of a vehicle 120, such as within the dashboard. In other embodiments, the after-market system 502 may be coupled at any suitable location, such as within the engine compartment, or in the trunk.

In some embodiments, the operations center can be configured to receive periodic transmissions from the on-board device even when there is no active data collection, so that if the on-board device is disabled or inoperative, the lack of transmissions can cause an alert to be issued to indicate tampering with the device, such as by attempting to alter the amount of miles driven by turning off the device, or by physically altering the collected mileage value.

Now the specification turns to the preconfiguration and specification of the geo-fence boundary. In particular, the size and shape of any geo-fence boundary that may be created responsive to a vehicle entering a political boundary may be initially preconfigured by a system administrator or an external agent before a vehicle is sold, rented, or otherwise turned over to a driver (e.g., prior to the vehicle being driven). The geo-fence boundary may be preconfigured as a region corresponding to the size and shape of a political boundary. In one embodiment, the geo-fence boundary may correspond to the size and shape of a state. In another embodiment, the geo-fence boundary may correspond to the size and shape of a county. In yet another embodiment, the geo-fence boundary may correspond to the size and shape of a country.

Figure 6:
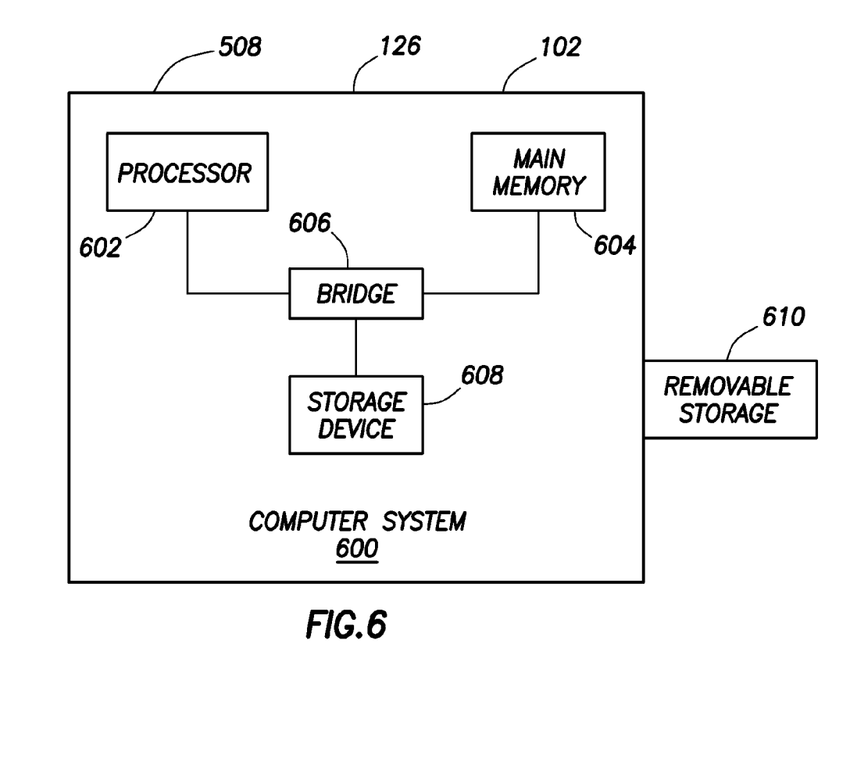
FIG. 6 shows a computer system in accordance with at least some embodiments.

FIG. 6 shows a computer system 600, which is illustrative of a computer system upon which the various embodiments may be practiced. The computer system 600 may be illustrative of, for example, computer system 126 coupled to the vehicle 120. In another embodiment, computer system 600 may be illustrative of processor 102. In yet another embodiment, the computer system could be illustrative of computer system 508 coupled to third-party after-market system 502. The computer system 600 comprises a processor 602, and the processor couples to a main memory 604 by way of a bridge device 606. Moreover, the processor 602 may couple to a long term storage device 608 (e.g., a hard drive, solid state disk, memory stick, optical disc) by way of the bridge device 606, and may couple to a removable storage device 610 (e.g., USB flash drive, CompactFlash card, Secure Digital card). Programs executable by the processor 602 may be stored on the storage device 608, or on removable storage device 610, and accessed when needed by the processor 602. The program stored on the storage device 608 may comprise programs to implement the various embodiments of the present specification, such as determining whether a vehicle has entered a political boundary, or collecting vehicle data related to the movement of the vehicle within an established geo-fence. In some cases, the programs are copied from the storage device 608 to the main memory 604, and the programs are executed from the main memory 604. In other cases, the programs are copied from removable storage 610 to the main memory 604. Thus, the main memory 604, storage device 608, and removable storage 610 shall be considered computer-readable storage mediums.

Figure 7:
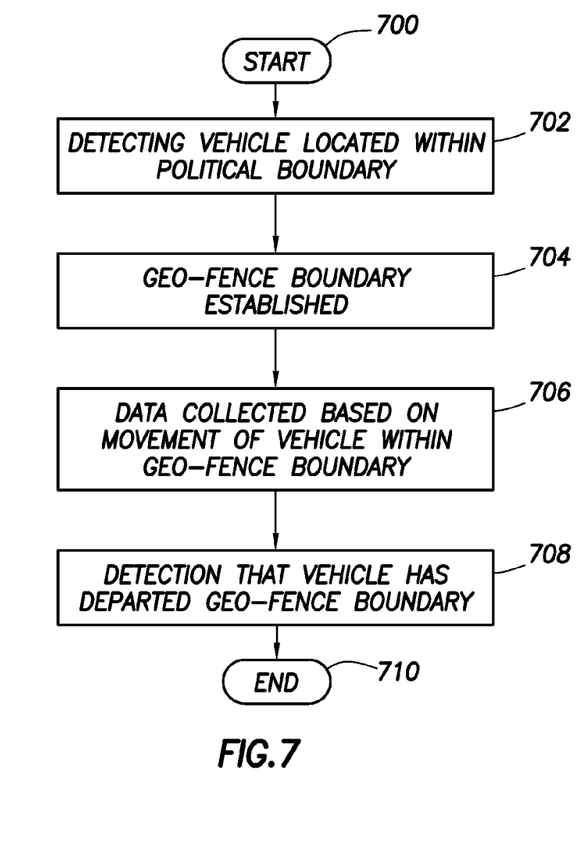
FIG. 7 shows, in block flow diagram form, a method in accordance with at least some embodiments.

The method of establishing a geo-fence boundary and collecting mileage data will now be discussed in more detail. FIG. 7 shows a flow diagram depicting an overall method of establishing a geo-fence and collecting data based on movement of the vehicle within the geo-fence. The method starts (block 700), and moves to detecting a vehicle is located within a political boundary (block 702). At the point a vehicle is detected as being located within a political boundary, a geo-fence boundary is automatically established corresponding to the size and shape of the political boundary (block 704). Once the geo-fence is established, the monitoring system 124, in conjunction with the computer system 126, monitors movement of vehicle 120 with respect to the geo-fence boundary and data is collected based on the movement of the vehicle within the geo-fence boundary (block 706). The method then moves to detecting that the vehicle has departed the geo-fence boundary (block 708). Thereafter, the method ends (block 710).

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of a vehicle is traveling within a state. This context, however, shall not be read as a limitation as to the scope of one or more of the embodiments described—the same techniques may be used for other automatic geo-fence establishing, vehicle movement detection, and data calculation. It is intended that the following claims be interpreted to embrace all such variations and modifications.

What is claimed is:

1. A method comprising:
   detecting a vehicle is located within a first political boundary;
   establishing a first geo-fence boundary for the vehicle corresponding to the first political boundary, the establishing responsive to detecting the vehicle is within the first political boundary;
   collecting data regarding the vehicle movement within the first geo-fence boundary;
   detecting a transition from the first political boundary to a second political boundary;
   establishing a second geo-fence boundary for the vehicle corresponding to the second political boundary;
   collecting data regarding the vehicle movement within the second geo-fence boundary; and
   detecting the vehicle has departed the second geo-fence boundary.

2. A method comprising:
   detecting a vehicle is located within a first political boundary, the detecting by way of an on-board device coupled to the vehicle;
   establishing a first geo-fence boundary for the vehicle corresponding to the first political boundary, the establishing responsive to detecting the vehicle is within the first political boundary;
   collecting an indication of mileage driven by the vehicle within the first geo-fence boundary, the collecting by way of the on-board device;
   detecting the vehicle has departed the first gee-fence boundary; and
   sending the indication of mileage driven to a representative of the first political boundary.

3. A method comprising:
   detecting a vehicle is located within a first political boundary, the detecting by way of an on-board device coupled to the vehicle;
   establishing a first geo-fence boundary for the vehicle corresponding to the first political boundary, the establishing responsive to detecting the vehicle is within the first political boundary;
   collecting an indication of mileage driven by the vehicle, the collecting by way of a processor at an operations center remote from the vehicle, the operations center coupled to the vehicle by way of a wireless network;
   detecting the vehicle has departed the first pea-fence boundary; and then
   sending the indication of mileage driven to a representative of the first political boundary periodically, the periodically sending by way of the wireless network.

4. A method comprising:
   detecting a vehicle is located within a first political boundary, the detecting by an operations center remote from the vehicle, the operations center coupled to the vehicle by way of a wireless network;
   establishing a first geo-fence boundary for the vehicle corresponding to the first political boundary, the establishing responsive to detecting the vehicle is within the first political boundary;
   collecting an indication of mileage driven within the first political boundary, the collecting by way of an on-board device coupled to the vehicle;
   detecting the vehicle has departed the first geo-fence boundary; and then
   sending the indication of mileage driven to a representative of the first political boundary by way of the wireless network.

5. A method comprising:
   detecting a vehicle is located within a first political boundary, the detecting by an operations center remote from the vehicle, the operations center coupled to the vehicle by way of a wireless network;
   establishing a first geo-fence boundary for the vehicle corresponding to the first political boundary, the establishing responsive to defecting the vehicle is within the first political boundary;
   collecting an indication of mileage driven within the first political boundary by way of the operations center;
   detecting the vehicle has departed the first geo-fence boundary; and then
   sending the indication of mileage driven to a representative of the first political boundary by way of the operations center.

6. A method comprising:
   detecting a vehicle is located within a first political boundary;
   establishing a first geo-fence boundary for the vehicle corresponding to the first political boundary, the establishing responsive to detecting the vehicle is within the first political boundary;
   determining an indication of mileage driven within the first political boundary, the determining by way of an on-board device coupled to the vehicle;
   detecting the vehicle has departed the first geo-fence boundary; and then
   sending the indication of mileage driven to a representative of the first political boundary.

7. A method comprising:
   detecting a vehicle is located within a first political boundary;
   establishing a first geo-fence boundary for the vehicle corresponding to the first political boundary, the establishing responsive to detecting the vehicle is within the first political boundary;
   determining an indication of mileage driven within the first political boundary, the determining by way of a remote operations center coupled to the vehicle by way of a wireless network;
   detecting the vehicle has departed the first geo-fence boundary; and then
   sending the indication of mileage driven to a representative of the first political boundary.

8. A method comprising:
   detecting a vehicle is located within a first political boundary;
   establishing a first geo-fence boundary for the vehicle corresponding to the first political boundary, the establishing responsive to detecting the vehicle is within the first political boundary;
   determining an indication of mileage driven by the vehicle within the first political boundary and
   detecting the vehicle has departed the first pea-fence boundary.

9. The method of claim 8 wherein determining further comprises determining based on GPS data collected during movement of the vehicle.

10. The method of claim 8 wherein determining further comprises:
    reading an odometer of the vehicle when the vehicle enters the first political boundary; and then
    reading the odometer of the vehicle when the vehicle departs the first political boundary.

11. The method of claim 8 wherein determining further comprises:
   reading an odometer of the vehicle when the vehicle ignition is activated; and then
   reading the odometer of the vehicle when the vehicle ignition is deactivated.

12. A method comprising:
   detecting a vehicle is located within a first political boundary;
   establishing a first geo-fence boundary for the vehicle corresponding to the first political boundary, the establishing responsive to detecting the vehicle is within the first political boundary;
   collecting data regarding the vehicle movement within the first geo-fence boundary;
   receiving a signal that indicates operability of an onboard device coupled to the vehicle, the receiving at an operations center and the signal received periodically over a first period of time;
   determining absence of receipt of the signal in a second period of time following the first period of time;
   issuing an alert responsive to the determining, the alert indicative of at least one selected from the group consisting of: tampering with the onboard device; and disablement of the onboard device.

13. A system comprising:
   a processor;
   a memory coupled to the processor, the memory storing a program that, when executed by the processor, causes the processor to:
      detect a vehicle is located within a first political boundary;
      establish a first geo-fence boundary for the vehicle corresponding to the first political boundary, the establishing responsive to detecting the vehicle is within the first political boundary;
      collect data regarding the vehicle movement within the first geo-fence boundary;
      detect the vehicle is located within a second political boundary;
      establish a second geo-fence boundary for the vehicle corresponding to the second political boundary;
      collect data regarding the vehicle movement within the second geo-fence boundary; and
      detect the vehicle has departed the second geo-fence boundary.

14. As system comprising:
   a processor, wherein the processor is part of an onboard device coupled to a vehicle;
   a memory coupled to the processor, the memory storing a program that, when executed by the processor, causes the processor to:
      detect a vehicle is located within a first political boundary;
      establish a first geo-fence boundary for the vehicle corresponding to the first political boundary, the establishing responsive to detecting the vehicle is within the first political boundary;
      collect an indication of mileage driven by the vehicle within the first geo-fence boundary;
      detect the vehicle has departed the first geo-fence boundary; and then
      send the indication of mileage driven to a representative of the first political boundary.

15. A system comprising:
   a processor, wherein the processor is part of an on-board device coupled to a vehicle;
   a memory coupled to the processor, the memory storing a program that, when executed by the processor, causes the processor to:
      detect a vehicle is located within a first political boundary;
      establish a first geo-fence boundary for the vehicle corresponding to the first political boundary, the establishing responsive to detecting the vehicle is within the first political boundary;
      collect data regarding the vehicle movement within the first geo-fence boundary, wherein the data is sent periodically to an operations center remote from the vehicle and detect the vehicle has departed the first geo-fence boundary.

16. A system comprising;
   a processor, wherein the processor is part of an on-board device coupled to a vehicle;
   a memory coupled to the processor, the memory storing a program that, when executed by the processor, causes the processor to:
      detect a vehicle is located within a first political boundary;
      establish a first geo-fence boundary for the vehicle corresponding to the first political boundary, the establishing responsive to detecting the vehicle is within the first political boundary;
      collect an indication of mileage driven by the vehicle; and
      detect the vehicle has departed the first geo-fence boundary.

17. A system comprising:
   a processor, wherein the processor is part of an operations center remote from a vehicle communicatively coupled by way of a wireless network;
   a mapping module coupled to the processor;
   a memory coupled to the processor, the memory storing a program that, when executed by the processor, causes the processor to:
      detect a vehicle is located within a first political boundary;
      establish a first geo-fence boundary for the vehicle corresponding to the first political boundary, the establishing responsive to detecting the vehicle is within the first political boundary;
      collect data regarding the vehicle movement within the first geo-fence boundary; and
      detect the vehicle has departed the first geo-fence boundary.

18. The system of claim 17 further comprising:
   wherein when the processor collects, the program causes the processor to receive from the vehicle an indication of mileage driven; and then
   send the indication of mileage driven to a representative of the first political boundary.

19. The system of claim 17 further comprising:
   wherein when the processor collects, the program causes the processor to collect an indication of mileage driven by the vehicle; and then
   send the indication of mileage driven to a representative of the first political boundary.

20. The system of claim 17 wherein when the processor collects, the program further causes the processor to store data in an on-board device coupled to the vehicle.

21. A system comprising;
a processor;
a memory coupled to the processor, the memory storing a program that, when executed by the processor, causes the processor to:
- detect a vehicle is located within a first political boundary;
- establish a first geo-fence boundary for the vehicle corresponding to the first political boundary, the establishing responsive to detecting the vehicle is within the first political boundary;
- collect data regarding the vehicle movement within the first geo-fence boundary;
- periodically send data indicative of a position of the vehicle to a remote operations center; and
- detect the vehicle has departed the first geo-fence boundary.

22. A system comprising:
a processor;
a Global Positioning System receiver coupled to the processor;
a memory coupled to the processor, the memory storing a program that, when executed by the processor, causes the processor to:
- detect a vehicle is located within a first political boundary;
- establish a first geo-fence boundary for the vehicle corresponding to the first political boundary, the establishing responsive to detecting the vehicle is within the first political boundary;
- collect an indication of mileage driven by the vehicle within the first political boundary using the Global Positioning System receiver;
- collect data regarding the vehicle movement within the first geo-fence boundary; and
- detect the vehicle has departed the first geo-fence boundary.

23. A system comprising:
a processor;
a wireless receiver coupled to the processor;
a memory coupled to the processor, the memory storing a program that when executed by the processor, causes the processor to:
- detect a vehicle is located within a first political boundary;
- establish a first geo-fence boundary for the vehicle corresponding to the first political boundary, the establishing responsive to detecting the vehicle is within the first political boundary;
- collect an electronic reading on an odometer when the vehicle enters the first political boundary;
- collect the electronic reading on the odometer when the vehicle departs the first political boundary;
- receive data from the vehicle by way of the wireless receiver; and
- detect the vehicle has departed the first geo-fence boundary.

24. As system comprising:
a processor;
a memory coupled to the processor, the memory storing a program that, when executed by the processor, causes the processor to:
- detect a vehicle is located within a first political boundary;
- establish a first geo-fence boundary for the vehicle corresponding to the first political boundary, the establishing responsive to detecting the vehicle is within the first political boundary;
- collect an electronic reading on an odometer when the vehicle enters the first political boundary; and then
- collect the electronic reading on the odometer when the vehicle departs the first political boundary; and
- detect the vehicle has departed the first geo-fence boundary.

25. As system comprising:
a processor;
a memory coupled to the processor, the memory storing a program that, when executed by the processor, causes the processor to:
- detect a vehicle is located within a first political boundary;
- establish a first geo-fence boundary for the vehicle corresponding to the first political boundary, the establishing responsive to detecting the vehicle is within the first political boundary;
- collect data regarding the vehicle movement within the first fence boundary;
- receive a signal that indicates operability of an onboard device coupled to the vehicle, the receiving at an operations center and the signal received periodically over a first period of time;
- determine absence of receipt of the signal in a second period of time following the first period of time;
- issue an alert responsive to the determining, the alert indicative of at least one selected from the group consisting of: tampering with the onboard device; and disablement of the onboard device.

* * * * *